Dec. 25, 1923. 1,478,506
O. F. R. BROMBERG
COMBINED TIRE VALVE AND PRESSURE GAUGE
Filed July 2, 1920
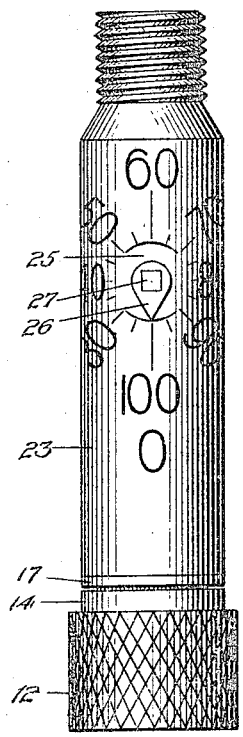
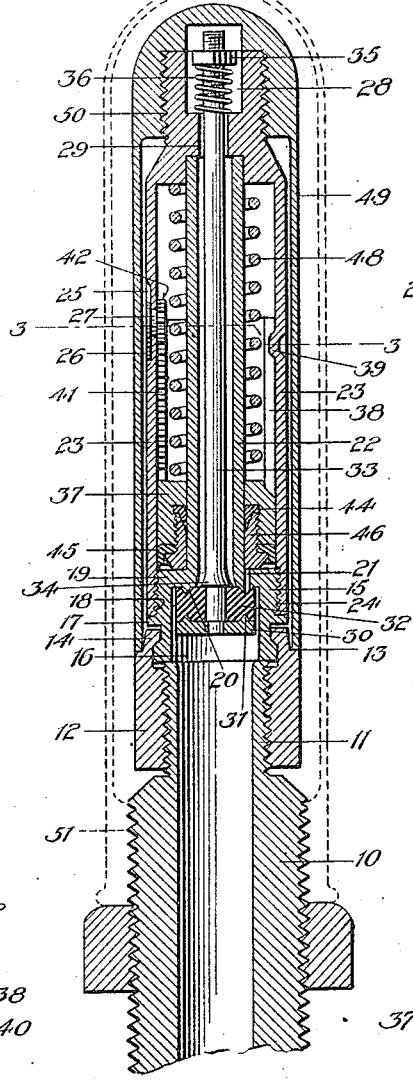
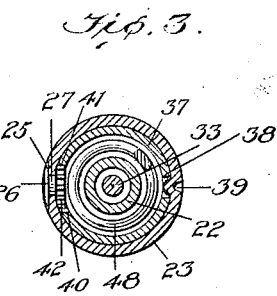
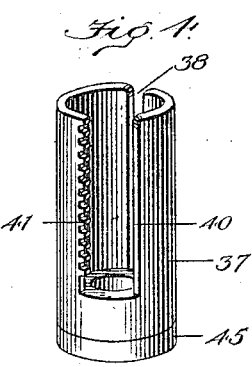
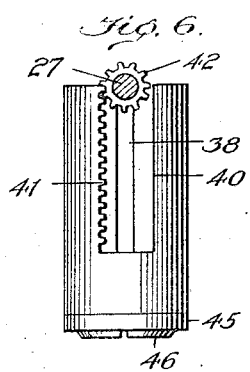
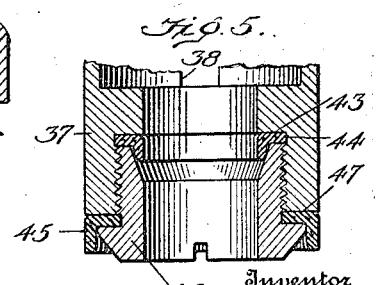

Patented Dec. 25, 1923.

1,478,506

UNITED STATES PATENT OFFICE.

OSCAR F. R. BROMBERG, OF LOS ANGELES, CALIFORNIA.

COMBINED TIRE VALVE AND PRESSURE GAUGE.

Application filed July 2, 1920. Serial No. 393,641.

*To all whom it may concern:*

Be it known that I, OSCAR F. R. BROMBERG, a citizen of the United States, residing at Los Angeles, in the county of Los Angeles and State of California, have invented certain new and useful Improvements in Combined Tire Valves and Pressure Gauges; and I do hereby declare the following to be a full, clear, and exact description of the invention, such as will enable others skilled in the art to which it appertains to make and use the same.

My present invention broadly stated, relates to pneumatic tires for vehicles, but has particular reference to a combined tire-valve and pressure-gauge for use upon inner tubes of tires.

This invention therefore has for its primary object the production of a substantial tire valve and a compact, reliable pressure gauge of novel construction, combined in a single self-contained unit readily attachable to standard valve stems.

A further object is the production of an exceedingly small, compact, durable, and yet reliable valve and pressure gauge, wherein all parts are balanced or concentrically positioned with relation to the valve stem which they surmount, and wherein the air pressure upon moving parts is centrally applied as a consequence of said balanced relation and adaptation of parts.

A further object of this invention is the production of a combined tire valve and pressure gauge, the latter having a suitable indicator which is designed, arranged and adapted to indicate air pressures from within the tube whenever said valve is manually opened, or whenever an air-filling hose is attached, but which gauge is relieved of pressure at all other times by agency of the valve itself.

A further object is the production of certain novel and important details of construction arranged and adapted to cooperate in producing a combined tire valve and pressure gauge of unusual compactness, of great simplicity and of materially increased efficiency, including certain renewable and interchangeable means for forming an air-tight double seal between the relatively fixed and movable gauge members; as also including novel indicating means comprising a rotary indicator actuated by agency of a rack and pinion contained within the gauge structure.

With the foregoing and other objects in view the present invention will be hereinafter particularly described and then pointed out by the claims following.

In the accompanying drawings, magnified three times in size for the sake of clearness, which form part of this application for Letters Patent, and whereon corresponding characters refer to like parts in the several views:

Figure 1 is a longitudinal central section of the invention with its outer dust cap or cover shown only in dotted lines, and including a fragment only of an ordinary standard valve stem;

Figure 2 is a view in front elevation of the pressure cylinder detached, its rotary indicator, and underlying swivel or coupling;

Figure 3 is a transverse section through the invention taken on the zig-zag line 3—3 of Figure 1, the outer dust cap and also the auxiliary dust cap which appears in Figure 1, being here omitted;

Figure 4 is a view in perspective of actuating plunger detached;

Figure 5 is a fragmentary view still further enlarged for clearness, showing in longitudinal central vertical section the lower end of plunger; and Figure 6 is also a detached view showing in side elevation the plunger aforesaid, and a pointer actuating pinion engaging the rack thereof.

Reference being had to the drawings and numerals thereon, 10 indicates an ordinary standard valve stem, having the reduced and screw-threaded outer end or neck 11 to which the present combined tire valve and pressure gauge is readily attached, by means of a screw-threaded coupling or swivel 12 as shown.

The said swivel 12 may be shouldered as at 13 and is provided with an inwardly extending annular flange 14 embracing in swivelled relation, the enlarged lower extremity of a combined intermediate coupling member and valve casing 15. This casing is of inverted cup shape, thus forming a valve chamber 16, and its lower annular surface is machined to fit closely upon the outer reduced end 11 of valve stem 10 when drawn into contact therewith by operation of the swivel 12. It will be noted, however, that the inner diameter of said valve chamber 16 as shown in the present illustrations, is slightly greater than that of the valve stem 10, which latter accordingly may serve as a limiting stop for the tire valve shortly to be described. At the same time these diameters may be reversed or may conform exactly in size since the stop afforded by the end of stem 10 is by no means essential.

Just above its aforesaid enlarged lower extremity casing 15 is surrounded by an exterior flange 17, and is screw threaded above said flange as at 18 for purposes which will later appear. The top of said valve chamber 16 constitutes a circular valve seat 19, provided with a depending annular sealing ridge 20, and a small air port or by-pass 21, at one side as shown by Figure 1; while in open communication with said valve chamber 16 is an upwardly extending, centrally positioned relatively fixed tubular air conductor 22.

This air conductor 22 at its upper end is centered in the upper end of a hollow pressure cylinder 23, provided at its lower end with an internal screw thread 24 adapted to couple with the threads 18 of casing 15, and to be stopped in operative position by engagement with flange 17 upon the exterior of said casing.

Upon the face of cylinder 23 is rolled or otherwise cut, a suitable pressure indicating scale from 0 to 100 degrees more or less in substantially circular arrangement as shown by Figure 2, and within this space is provided a central surface depression 25, arranged and adapted to house a rotary pointer or indicator 26, mounted upon an indicator shaft 27, projecting through said cylinder 23, and actuated by a novel plunger mechanism within said cylinder as will appear.

The upper extremity of cylinder 23 is provided with an open spring-pocket 28, and a central air duct 29 leading from said pocket into the centrally positioned air conductor 22 hereinbefore described.

Returning now to the valve chamber 16, it will be noted that same, and its valve seat 19 are in concentric arrangement and in approximate alinement with the bore of valve stem 10. Within this chamber 16, between its seat 19 and the upper shouldered end of said stem 10, is located the tire valve 30 having upon its upper surface an annular ridge 31, and a gasket of rubber or other elastic material 32 in which said ridge is firmly embedded. Doweled into said valve 30 is a valve stem 33 shouldered as at 34 to retain said gasket 32 in position. This valve stem 33 rises vertically through the center of air conductor 22, the air duct 29, and spring-pocket 28, where it terminates just above the latter and is fitted with a small nut or bur 35, between which and the bottom of pocket 28, there is positioned a spring 36 surrounding the valve stem for the purpose of normally seating the tire valve.

Within the cylinder 23 is telescopically arranged a cylindrical air pressure plunger 37 such as indicated by Figures 4, 5 and 6 of the drawings. This plunger movably but snugly fits the interior of said cylinder 23, and also the exterior of the air conductor 22, which latter it therefore surrounds. It comprises a cylindrical or tubular body guided in its vertical movements by a narrow slot 38 engaging a relatively fixed stud 39 projecting inwardly from cylinder 23 at a point opposite and slightly below the indicator shaft 27 hereinbefore mentioned. Diametrically opposite the said slot 38 is a second longitudinal slot 40 of greater dimensions, having a rack 41 formed in one vertical edge thereof. Meshing with said rack 41 is a pinion 42 keyed to the aforesaid indicator shaft 27 by agency of which rack and pinion the indicator 26 is actuated clockwise or counter-clockwise as the plunger rises or falls under more or less air pressure.

The tubular body portion of plunger 37 is shouldered annularly as at 43 to receive an interior cup washer 44, for securely packing same with relation to its tubular guiding and air conductor member 22 as best shown by Figure 5. Bearing upon the lowermost end of the same plunger body portion 37 is also an exterior cup washer 45 serving to likewise pack said plunger with relation to the interior of cylinder 23 during reciprocation, and it will be seen by reference to Figure 5 that both of said cup washers 44 and 45 are securely retained in operative position by engagement of a hollow screw nipple 46 shouldered as at 47 and threaded into the lower open end of said annular plunger 37. It will be also particularly noted that the said cup washers 44 and 45 are air-packed when under air pressure during upward movements of the plunger 37 for purposes of a pressure reading, or during the ordinary process of tire inflating.

Within the plunger cylinder 37 and surrounding the central air conductor 22 is a plunger-spring 48, under proper compression, bearing at one end beneath the outermost end of cylinder 23, and at its opposite end upon the interior lower surface of plunger 37, for the purpose of returning said plunger to its normal position after each pressure reading.

As an extra precaution an auxiliary quickly detachable sheath or dust cap 49 is provided for encasing the cylinder 23 and its rotary indicator 26. If desired this cap 49 may be of transparent material, or of any suitable material, either with or without a transparent window to facilitate pressure readings. It may also be applied in various ways, that shown being convenient and comprising a threaded attachment as at 50. Over all is then applied the ordinary quickly detachable dust cap 51 shown in dotted lines by Figure 1, the same being threaded on to the valve stem 10 in the usual manner.

Constructed and arranged substantially as shown and described the practical use and operation of this combined tire valve and pressure gauge may now be briefly set forth as follows:

Inflation of a tire is accomplished in the ordinary and well understood manner after removal of dust cap 51, and the auxiliary cap 49 when the latter is employed, the pressure in the meantime being registered by agency of indicator 26 upon the degree scale appearing upon the surface of cylinder 23. And, obviously after the inflation of an inner tube, and removal of the air line hose, tire valve 30 is securely closed by air pressure from within said tube, supplemented by compression spring 36 operating through valve stem 33, to prevent the escape of air from tube stem 10, by way of central air conductor 22. A superior sealing of outlet conductor 22 against accidental escape of air pressure is insured by interposition of the elastic or resilient gasket 32, between said valve 30 and its seat 19, as also by reason of co-acting annular ridges 20 and 31; but more especially because of the direct acting concentric arrangement and relation of valve chamber 16, the outlet of tube stem 10, and the within contained centrally positioned direct acting valve elements.

Presuming now that it becomes desirable to test the internal pressure of a tire tube in service. After removal of dust caps 51 and 49, the operator manually depresses valve stem 33 at the same time closing with his finger the spring pocket 28, thus preventing the direct escape of air through conductor 22, from stem 10 past the open valve 30.

With the opening of valve 30 the by-pass or port 21 of course also opened, and air from stem 10 being unable to escape past the operator's finger out of spring pocket 28, passes through said port 21 beneath plunger 31, which thereupon rises, compressing spring 48.

As plunger 31 rises it is guided vertically by the central air duct 22 which it surrounds, by the inner walls of the cylinder 23 by which it is surrounded, and by inwardly projecting stud 39 resting in guide slot 38 to prevent rotary movement. As it rises also its rack 41 engaging pinion 42, rotates the latter, its shaft 27, and indicating pointer 26 clockwise to accurately indicate the degree of pressure beneath said plunger and consequently within the tire tube (not shown). During this upward movement of plunger 37 it will be particularly noted that when same reaches the highest point in its travel, its upper edge is stopped by engagement with the inside top of cylinder 23 before either the guide stud 39 or the pinion 42 reach the bottom of their respective slots 38 and 40, so that there is no strain whatever imposed upon said stud and pinion.

It is also a noticeable fact that the washer 45 of cup shape is more securely packed against the inner walls of cylinder 23 during the upward movement, by agency of the air pressure beneath, at a time when it is most desirable to prevent the escape of said pressure from beneath the plunger, and the same is true in a degree of cup washer 44.

After each pressure reading, removal of the operator's finger from the protruding end of valve stem 33 permits the tire valve 30 to return to its closed position as shown by Figure 1, under the combined action of compression spring 36 and the air pressure beneath, thus sealing the tire tube (not shown) against accidental leakage, simultaneously closing port 21 beneath plunger 37, and at the same time relieving cup washers 45 and 44 from air pressure to vary their diameters slightly.

Plunger spring 48 thereupon returns plunger 37 to its seated position shown by Figure 1, the comparatively relaxed cup-washers 45 and 44 permitting slow escape of trapped air around and between the several relatively slidable parts, and thence from cylinders 37 and 23 by way of the indicator shaft bearing, and otherwise to the outside atmosphere, thus rotating said indicator 26 counter-clockwise to its starting point or zero.

The foregoing being a disclosure of one practical embodiment of my present invention, it should be understood that I do not consider myself in the least limited or restricted to the particular arrangement and combination of parts shown and described, on the contrary these may be varied greatly, while at the same time operating upon like principles, and obtaining substantially the same practical results, and to all such modifications I lay claim the same as if hereinbefore specified.

It will be noted that the cup washers 44 and 45 are readily renewable should occasion arise after long and continuous use, and constitute renewable and interchangeable means for forming an air-tight seal, both in the center of the plunger around the air conductor or tube, and on the outside of the plunger between the plunger and inside wall of the cylinder.

It will also be noted that while the present combined tire-valve and pressure-gauge is a complete self-contained unit of equipment, it can also be conveniently used if so desired, in conjunction with an ordinary tire-valve mounted in a standard valve stem, that is to say the ordinary valve need not necessarily be removed.

Having thus described my invention what I now claim and desire to secure by Letters Patent is:—

1. In a pressure gauge the combination with a pressure cylinder, of a pressure plunger having a plurality of extended guide bearings engaging the inner walls of said cylinder, of a rack formed upon one of said extended bearings, a pinion meshing with said rack, and a visible pressure indicator actuated by said rack and pinion.

2. In a pressure gauge the combination with a pressure cylinder, of a pressure plunger reciprocally mounted within said cylinder, a rack carried by said plunger, a pinion journalled in said cylinder and engaging the rack aforesaid, and an exterior indicator actuated by said rack and pinion, and arranged to travel over indicia appearing upon the outer surface of the pressure cylinder.

3. In a pressure gauge the combination with a pressure cylinder, of a pressure plunger within said cylinder slotted longitudinally, a rack formed upon one edge of said slot, a pinion intermeshing with said rack and journalled in said cylinder, and a suitable indicator upon the outer surface of said cylinder actuated by the rack and pinion aforesaid.

4. In a pressure gauge the combination with a pressure cylinder, of a pressure plunger within said cylinder, a rack upon said plunger, a pinion meshing with said rack, a visible indicator actuated by said pinion, a longitudinal guide slot formed in the pressure plunger, and a guide stud projecting into said slot from the interior of said outer cylinder.

5. In a combined tire valve and pressure gauge the combination with a pressure cylinder, a pressure plunger and a tubular air conductor concentrically arranged, of an enlarged inverted valve casing formed upon the inner end of said conductor, a by-pass port through said casing beneath said plunger, a valve guarding both the air conductor and by-pass aforesaid, and means for indicating the pressure within said cylinder.

6. In a combined tire valve and pressure gauge the combination with a pressure cylinder and a within contained pressure plunger having a plurality of extended bearings engaging the interior walls of said cylinder, of a tubular air conductor, an enlarged valve casing formed integral with said conductor, a valve within said casing guarding the air conductor, a by-pass port through the valve casing beneath said plunger, and means for indicating air pressure within said cylinder.

In testimony whereof I affix my signature, in presence of two subscribing witnesses.

OSCAR F. R. BROMBERG.

Witnesses:
R. HUNTER,
R. H. BAIRD.